Jan. 4, 1927.
E. L. WORBOIS
1,613,369
NUT TAPPING MACHINE
Filed Jan. 7, 1924    7 Sheets-Sheet 7
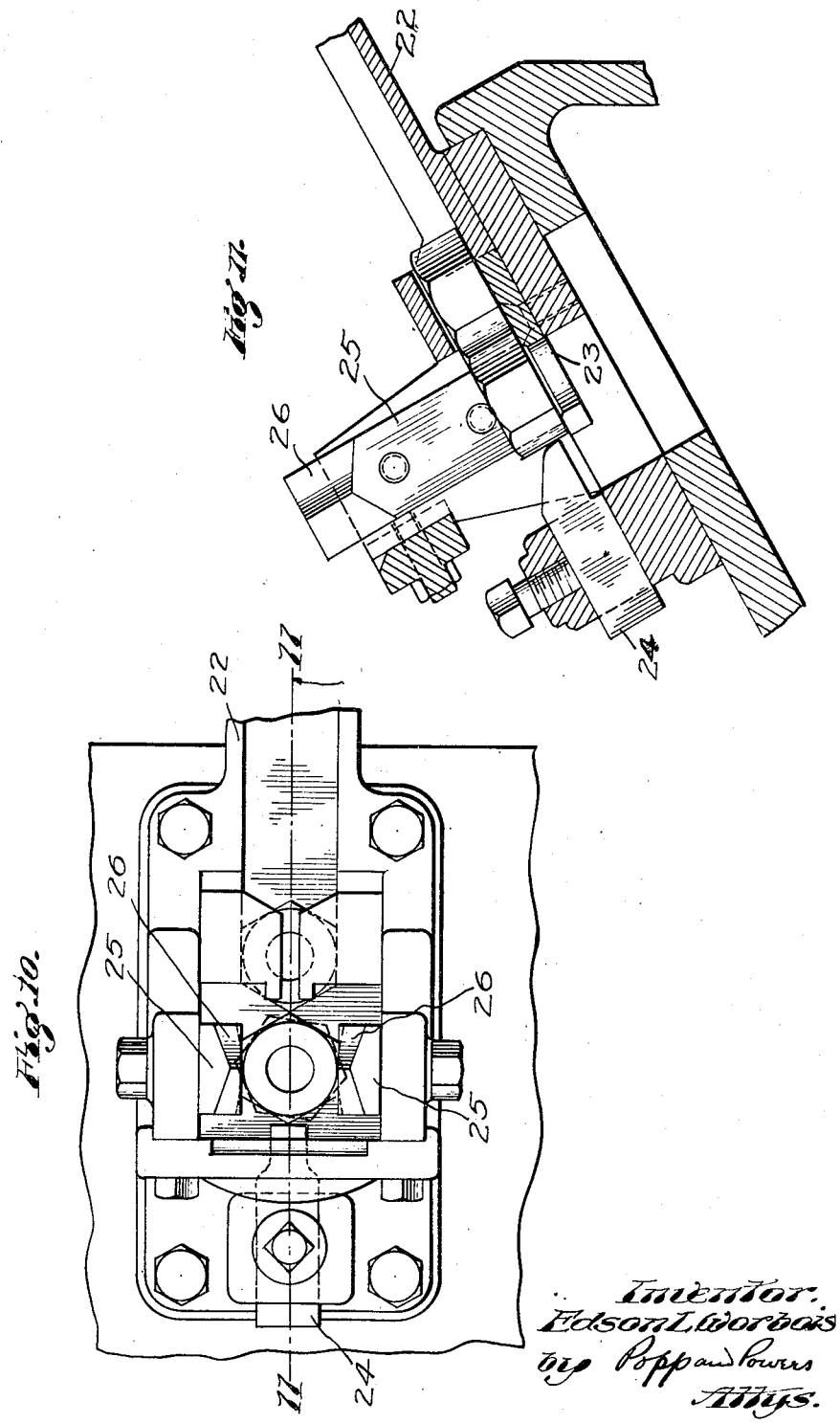

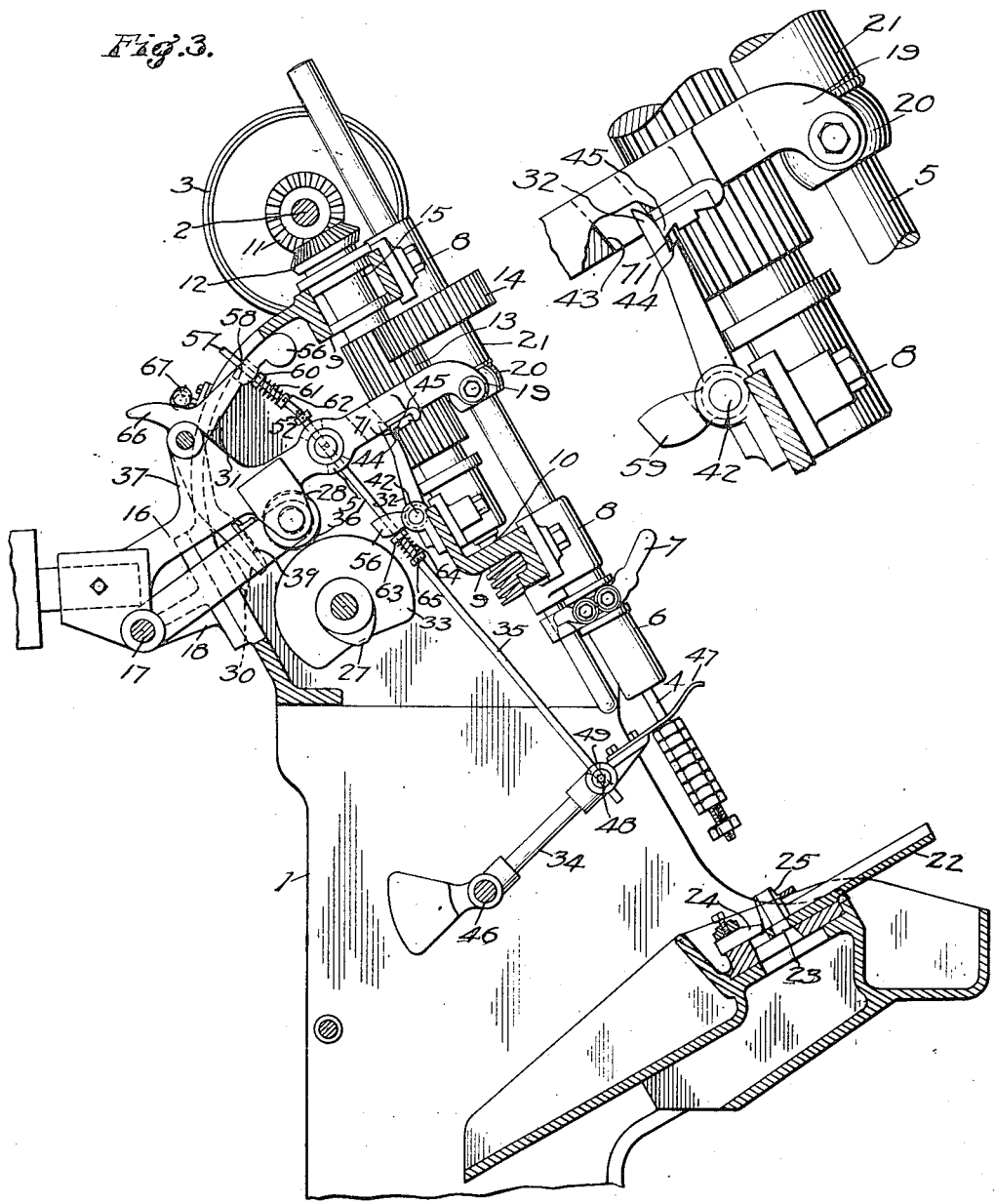

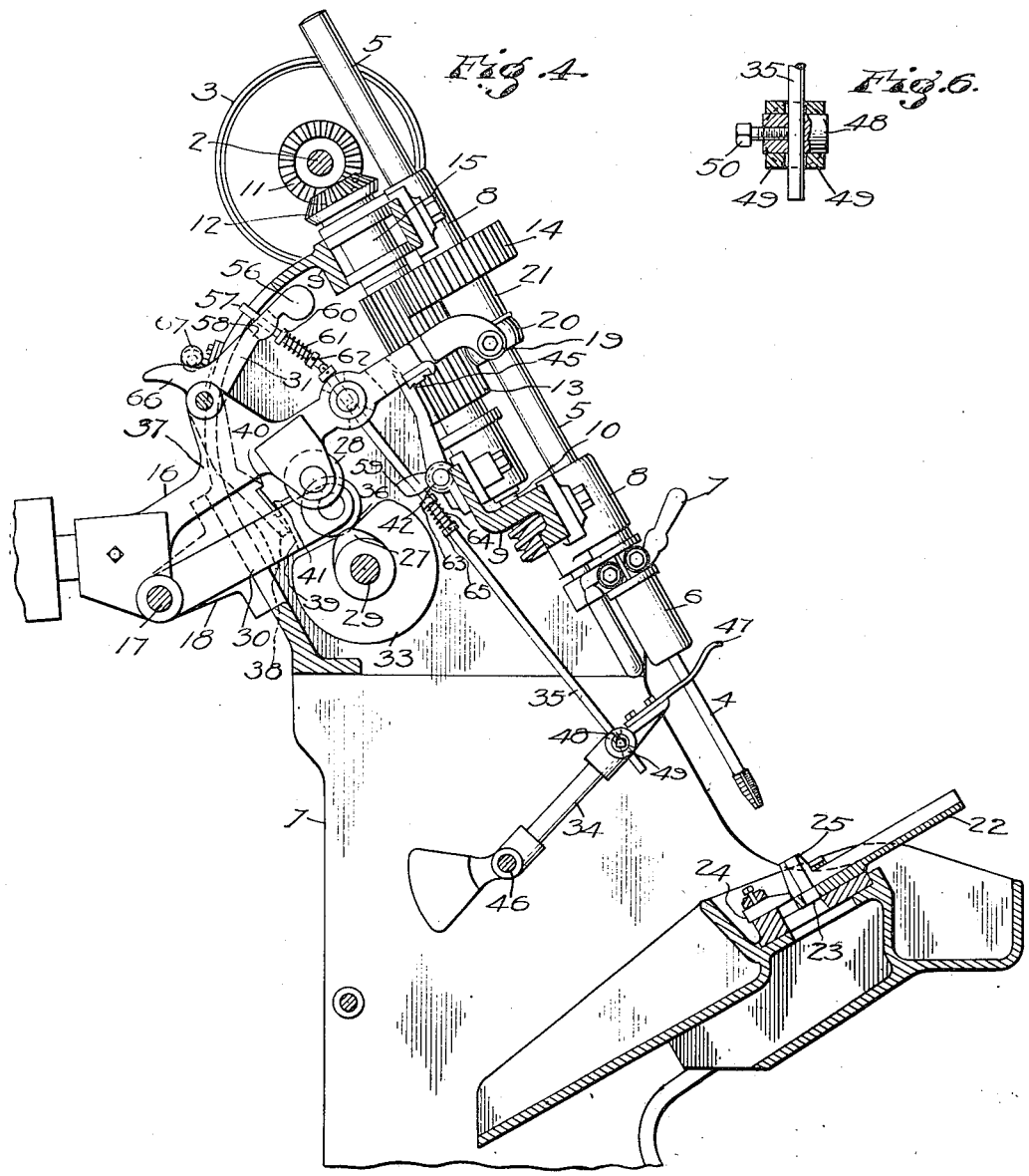

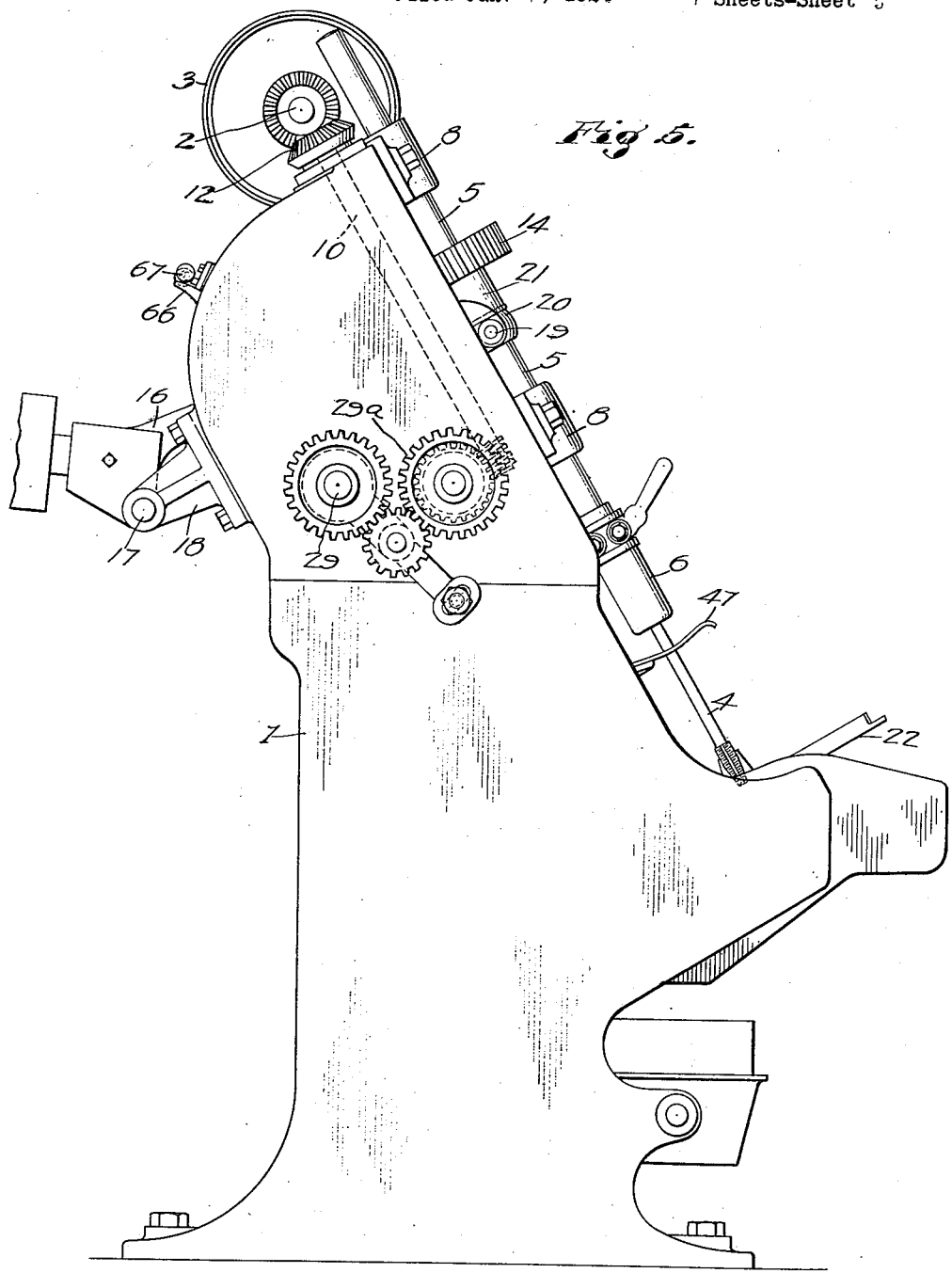

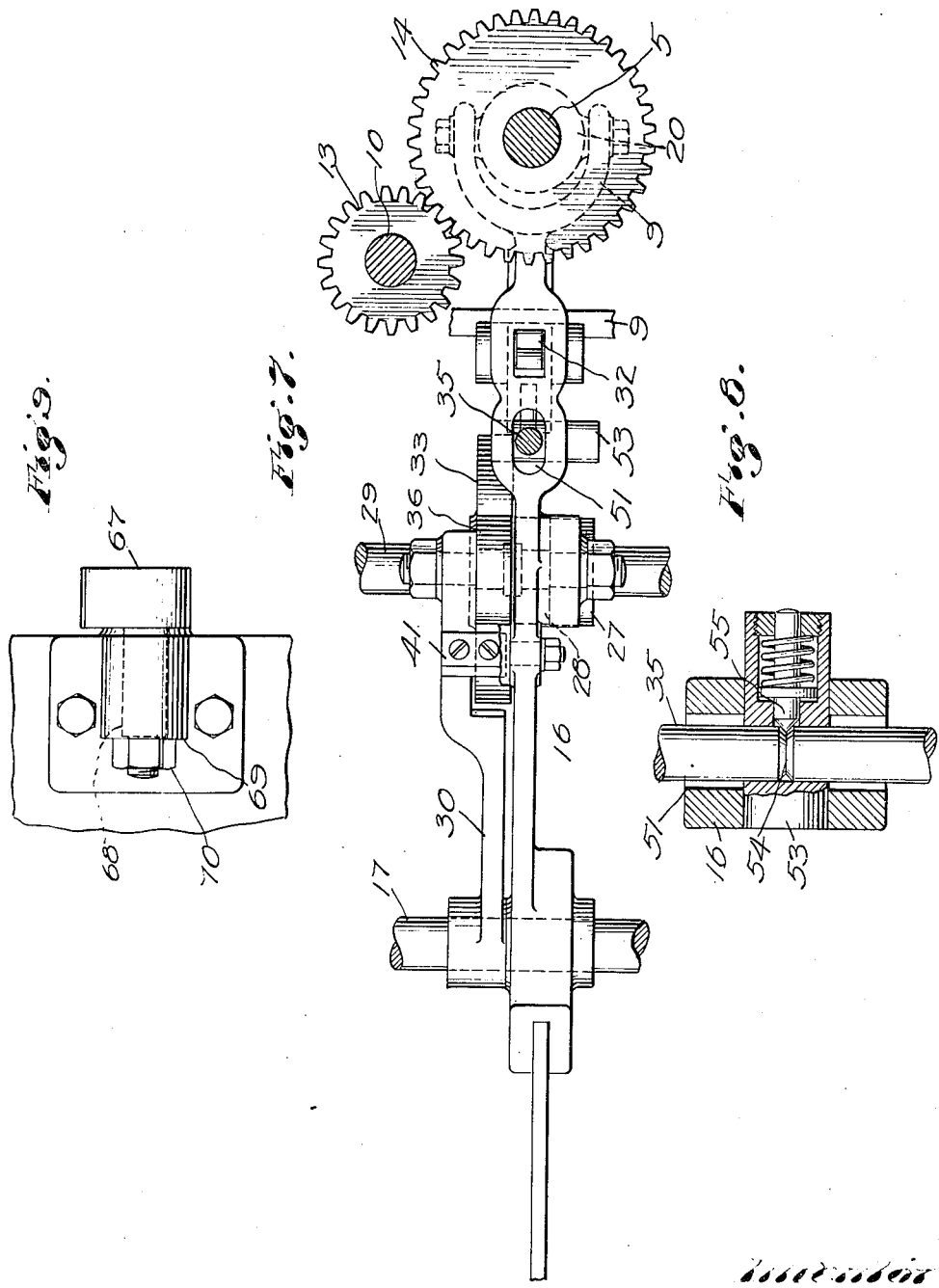

Patented Jan. 4, 1927.

1,613,369

UNITED STATES PATENT OFFICE.

EDSON L. WORBOIS, OF TONAWANDA, NEW YORK, ASSIGNOR TO HOWARD IRON WORKS, OF BUFFALO, NEW YORK, A CORPORATION OF NEW YORK.

NUT-TAPPING MACHINE.

Application filed January 7, 1924. Serial No. 684,726.

This invention relates to improvements in nut tapping machines.

The principal object is to provide a machine which by mechanism of simple structural character has a very considerably greater output than machines heretofore employed.

In the operation of nut tapping machines the tap acts repeatedly on the nut blanks fed thereto, being lifted at the end of each tapping operation to provide for the movement of the next nut blank to an operative position; and after a determined number of nut blanks have been tapped and reamed the tap is removed from the machine, stripped of the nuts which it carries and reinserted for a further series of tapping operations.

Heretofore no distinction has been made between the movements of the tap incident to the normal tapping operations and the movement of the tap preparatory to its removal from the machine; in other words all movements of the tap have been of uniform extent and for the purpose of providing for the feed of the nut blanks the tap has had the same extent of movement which is required for its removal from the machine. According to the present invention the movements of the tap incident to the tapping operations are quite short, being just sufficient to provide for the feeding of the nut blanks, whereas the movement of the tap which provides for its removal from the machine is longer to the necessary extent. Thus the nut tapping operations are performed in much more rapid sequence than has heretofore been possible.

The invention consists generally of a nut tapping machine in which provision is made for the above described movements of the tap and for the automatic co-relation of these movements whereby when a determined number of nuts have been tapped and reamed by a series of short movements of the tap, the tap holder is automatically lifted to and maintained in a higher position in which the tap may be removed from and reinserted into the machine.

An embodiment of the invention is illustrated in the accompanying drawings, in which:

Figure 3 is a similar view showing the tap in position for removal from the machine.

Figure 4 is a similar view but showing the tap stripped of the nuts and the mechanism set for the resumption of the normal tapping operations.

Figure 5 is an end view of the machine.

Figure 6 is a detail sectional view showing the connection between the trip-lever and the trip-rod.

Figure 7 is a detail sectional view on the line 7—7 of Figure 1.

Figure 8 is a detail sectional view showing the connection between the trip-rod and the spindle lever.

Figure 9 is an elevation of an adjustable stop for co-operation with the latch element by which the spindle operating lever is moved to its extreme upper position.

Figure 10 is a detail plan view of the nut guides and their associated parts.

Figure 11 is a detail sectional view on the line 11—11 of Figure 10.

Figure 12 is a detail fragmentary elevation drawn to an enlarged scale and showing more particularly the clearance between the spindle operating lever and its supporting latch when these parts are in the relative positions shown in Figure 3.

Figure 1:
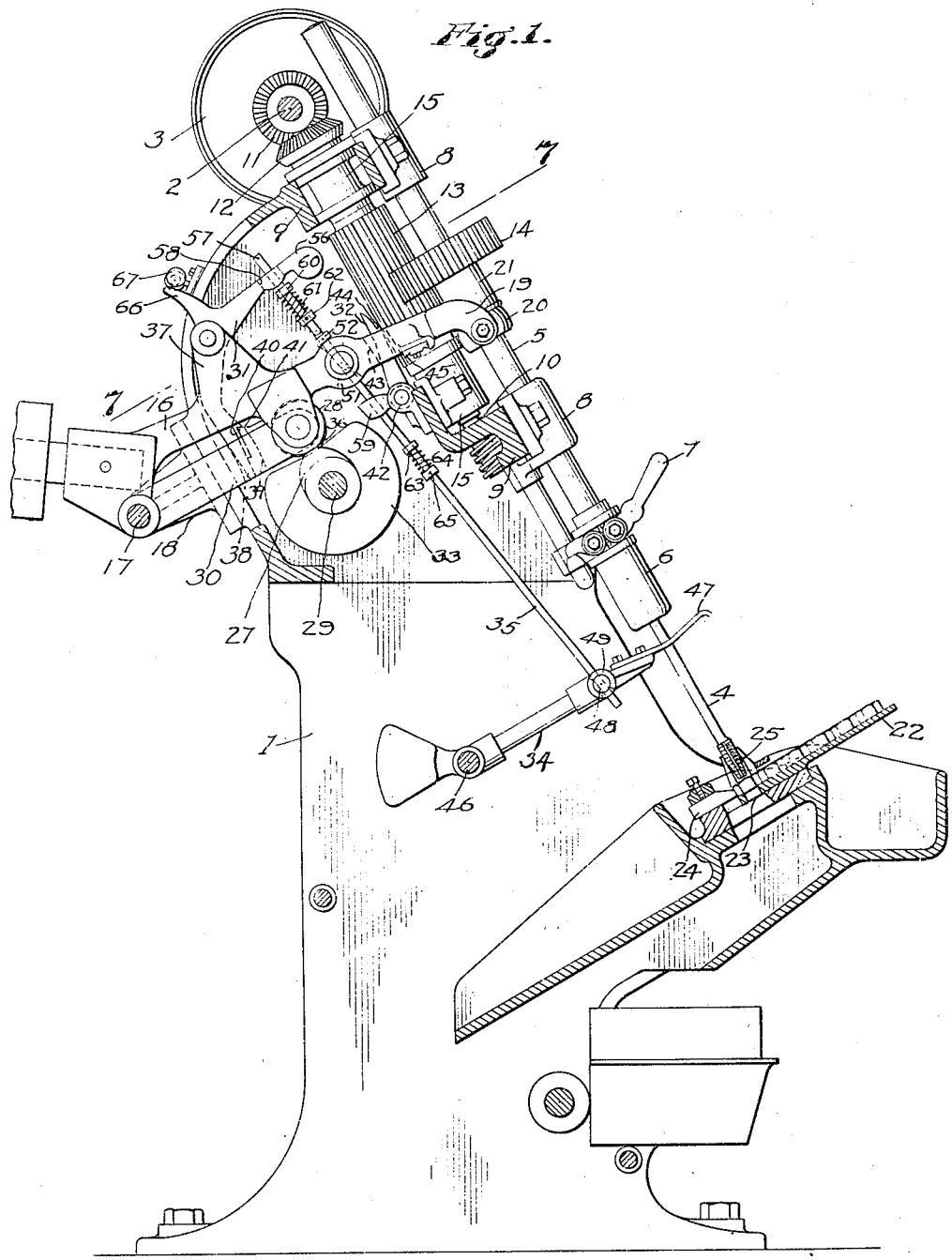
Figure 1 is a sectional view of the machine at a period of the nut tapping operations.

The operating parts are supported by a frame 1 above which is mounted a drive shaft 2 provided at one end with a drive pulley 3. The machine may carry any desired number of taps but since the features of the invention are the same for each tap the disclosure of a single tap is sufficient. The tap is shown at 4 and is operated by a spindle 5 to which it is connected by a suitable chuck 6 having a releasing handle 7. The spindle 5 is axially slidable in bearings 8 mounted upon the frame rails 9 and is driven from the shaft 2 by suitable gearing. As shown and preferred such gearing includes a countershaft 10 parallel to the spindle 5, co-operating bevel gears 11 and 12 on the shafts 2 and 10 respectively, and co-operating spur gears 13 and 14 on the shaft 10 and spindle 5 respectively. The gear 14 is fixed on and participates in the axial movements of the spindle 5 and is constantly in mesh with the gear 13 which is therefore suitably elongated. The shaft 10 is journalled in bearings 15 supported by the rails 9 and the gear 13 is mounted between the bearings 15.

The axial movements of the spindle 5 are directly effected and controlled by an oscillatory lever 16 which forms an element of the spindle moving mechanism, to be later described in detail, and is pivoted at its rear end, as at 17, to a bracket 18 secured at the rear side of the frame 1. The spindle operating lever 16 is formed at its front end with a fork 19 within which is pivotally mounted a collar 20 loosely surrounding the spindle 5. The collar 20 forms an operative connection between the lever 16 and the spindle 5 and for this purpose has co-operating engagement with a hub extension 21 of the gear 14.

An inclined chute 22 serves for the feed of the nut blanks to the tap. This chute terminates directly under the tap where it is provided with an opening 23 which affords clearance for the tap. The lowermost nut in the chute 22 is held in exact alinement with the tap by an adjustable stop block 24. A pair of vertical nut guides 25, arranged at opposite sides of the tap and projecting upward from the lower end of the chute serve, by engagement with the opposite flat faces of the nuts, to hold them against rotation during the tapping and reaming operations. The guides 25 are of suitable extent for the purpose in view and at their upper ends are formed with oppositely directed cam faces 26 (Figures 10 and 11). The tap 4 has a suitably elongated shank of somewhat less diameter than its working portion upon which the tapped nuts accumulate and on each downward movement of the tap the nuts near the lower end of the shank are turned by the cam faces 26 whereby they may pass between the opposing flat faces of the guides 25. Thus the cam faces 26 serve to prevent the nut guides from offering any obstruction to the downward movement of the tap.

The lever 16 is oscillated to effect the normal tapping operations of the tap 4 by a cam 27 and is provided with a roller 28 which engages said cam under the weight of the lever. The cam 27 is mounted upon a cam shaft 29 which is driven by suitable gearing 29ª (Figure 5) from one of the countershafts 10. The tap 4 has its working portion fashioned to serve both the tapping and reaming operations. The contour of the cam 27 is selected whereby the tap may be lowered at a rate slightly in excess of its rate of movement through the nut. During the downward movement of the tap the greater part of the tapping operation is performed. As the tap moves upward it carries with it the nut which it has partially tapped during its downward movement. This nut is held against rotation by the guides 25 and during the upward movement of the tap the tapping operation is completed and the further rotation of the working end of the tap in the threaded bore of the nut accomplishes the reaming operation. During each upward movement of the tap a nut blank moves into position against the stop 24 in readiness for the next tapping operation. In Figure 1 the tap is shown in the uppermost position of its normal tapping operation and it is particularly to be noted that the upward movement of the tap is just sufficient to provide suitable clearance for the movement of the next nut blank against the stop 24.

By the cam 27 the tap is operated repeatedly in relatively short upward and downward movements which accomplish the tapping and reaming operations; and incident to the rotation of the tap the nuts are fed upward along the same and accumulate in a pile upon the elongated shank which thus serves as a carrying core or mandrel. When a certain number of nuts have thus been threaded and reamed (this number being determined in accordance with the design and setting of the machine) and have accumulated upon the elongated shank of the tap, the tapping operation of the machine is automatically interrupted in order that the tap may be removed from the machine and another tap from which the nuts have been stripped may be inserted in readiness for the resumption of the tapping operation. However, since the upward movement of the tap as effected by the cam 27 is not sufficient to permit its removal from the machine, the chuck 6, in connection with the interruption of the tapping operation, is automatically brought to and maintained in a higher position in which the tap may readily be removed and re-inserted. Such higher position of the chuck 6 is shown in Figures 3 and 4, Figure 3 showing a tap upon which the nuts have accumulated and which is ready for removal and Figure 4 showing a tap from which the nuts have been stripped and which has been re-inserted into the machine in readiness for the resumption of the tapping operation.

The mechanism shown and preferred for accomplishing the movement of the chuck 6 to its higher position involves a lifting lever 30 which co-operates with a lifting latch 31 to effect a further upward movement of the spindle operating lever 16 and a supporting latch 32 for holding the lever 16 in its elevated position. The movements of the lever 30 are effected by a cam 33 mounted on the shaft 29 and the operation of the lever 30 is controlled by a trip lever 34 and a trip rod 35.

The lever 30 is mounted co-axially with the lever 16 on the pivot 17 and carries a roller 36 which under the weight of the lever 30 bears upon the cam 33. The lifting latch 31 is pivotally mounted on a lug 37 at the upper side of the lever 16 and is formed with a tail piece 38 which works in a slot or recess 39 in the lever 30. Above the tail piece 38 and at its forward side the latch 31 is formed with an overhanging catch 40 for engagement with a shoulder or projection 41 provided at the upper side of the lever 30. The catch 40 is normally disengaged from the shoulder 41 whereby during the tapping operation the lever 30 rides idly on the cam 33 and accomplishes no work. However when the latch 31 is shifted forward its catch 40 engages the shoulder 41 whereupon the spindle operating lever 16 is coupled by the latch 31 to the lever 30 and is raised, thus carrying the chuck 6 to the higher position shown in Figure 3. The supporting latch 32 is pivoted at 42 to an adjacent frame rail 9 and operates in a slot or recess 43 in the lever 16. The latch 32 is formed at its forward side with a catch 44 adapted to engage a shoulder or projection 45 on the under side of the lever 16. During the tapping operation the latch 32 works idly in the slot 43 but when the lever 16 has been fully raised by the lever 30 the latch 32 is shifted forward to engage its catch 44 with the projection 45 and thereby support the lever 16 in its fully raised position.

The trip lever 34 is mounted on a horizontal pivot 46 supported by the frame of the machine and is suitably counterweighted. At its front end said lever is provided with a fork 47 which straddles the tap 4 and is engaged by the uppermost nut on the shank of said tap at the time when the predetermined number of nuts have accumulated. When such engagement of the fork 47 takes place the lever 34 is raised on the next upward movement of the tap and by means of the trip rod 35 produces the operation of the latches 31 and 32. The fork 47 is also available as a handle by which the lever 34 may be manually restored to its normal position relatively to the lever 16, i. e., the position which it occupies during the tapping operation, thereby to provide for the resumption of such operation. The fork 47 is preferably pivotally adjustable whereby it may be adapted to machines of different capacities, the means of adjustment being conveniently available for the adjustment of the trip rod 35 relatively to the lever 16. As shown the fork 47 is carried by a pivot member 48 (Figure 6) which is journalled in ears 49 provided on the lever 34. The pivot member 48 has a diametrical bore in which the lower end of the trip rod 35 is fitted and a threaded axial bore in which is fitted a set screw 50. This screw is tightened against the trip rod and holds the same and the fork 47 in the positions to which they have been adjusted. The trip rod 35 projects through a slot 51 of suitable extent in the lever 16 and carries a collar 52 which, by engagement with the upper side of the lever 16, limits the downward movement of the trip rod, thereby co-operating with the screw 50 in holding the trip lever 34 in its normal position relatively to the lever 16.

Within the confines of the slot 51 the lever 16 is provided with a rotatably mounted trip rod bearing member 53 (Figures 7 and 8) which has a diametrical opening in which the trip rod is slidable. The trip rod is formed with an annular groove 54 and the bearing member 53 is provided with a spring pressed latch pin 55 formed at its inner end to engage in the groove 54. In the normal position of the trip lever 34 relative to the lever 16 the groove 54 is located below the pin 55 but as the trip lever is raised relatively to the lever 16 the trip rod is brought to a position in which the pin 55 engages in the groove 54. Thereupon the trip rod is raised by the lever 16 as the latter is operated by the cam 33 through the agency of the lifting lever 30 and lifting latch 31. The form of the groove 54 and pin 55 is such that their mutual engagement will reliably connect the trip rod to the lever 16 but will present no obstruction to the ordered movement of the trip rod relatively to said lever.

The lifting latch 31 is provided with a forward extension 56 and the trip rod is provided above the collar 52 with a pivotally mounted section 57 which projects through an opening 58 in the extension 56 and yields rearwardly or forwardly in accordance with the upward or downward movement of said extension. The supporting latch 32 is provided with a rearwardly extending fork 59 through which the trip rod projects. The lifting latch 31 is acted on by a follower 60 freely slidable on the trip rod and backed by a spring 61 which at its lower end bears against a collar 62 fixed on the trip rod but adjustable to any desired position, the follower 60 engaging the extension 56. The supporting latch 32 is acted on by a follower 63 freely slidable on the trip rod and backed by a spring 64 which at its lower end bears against a collar 65 fixed on the trip rod but adjustable to any desired position, the follower 63 engaging the fork 59. The follower 60 is, by the adjustment of the collar 62, so positioned on the trip rod that during the oscillation of the lever 16 by the cam 27, i. e., during the tapping operations of the machine, it will have no engagement with the lifting latch which in this period therefore remains in its inoperative position; but when the trip rod is raised and by the latch pin 55 connected to the lever 16 the follower 60 will shift the latch 31 forward as the lever 16 is raised by the cam 27 and thereupon the lever 16 will be further raised by the lifting lever 30 and cam 33, thus bringing the chuck 6 into the position in which the tap can be removed and re-inserted. The follower 63 engages the fork 59 shortly before the lever 16 is moved into its highest position by the lifting lever 30 with the result that when the shoulder 45 on the lever 16 has moved upward past the catch 44 on the supporting latch 32 the latter is snapped forward to engage said catch under said shoulder and thereby hold the lever 16 against downward movement.

The lifting latch 31 is provided with a rearward extension 66 which engages a stop pin 67 secured to the frame 1; and so long as the lever 16 is held in its uppermost position or is supported by the latch 32 the engagement of the pin 67 against the extension 66 is effective positively to compel and maintain the engagement of the latch 31 with the lever 30. The pin 67 is preferably adjustable within certain limits whereby it may be caused to compel the engagement of the latch 31 with the lever 30 at higher or lower points in the range of movement of the lever 16 and for this purpose said pin is in the form of a cylinder arranged eccentrically on a supporting stud 68 (Figure 9) and is adjustable about said stud as an axis. The stud 68 is fitted pivotally in a fixed supporting lug 69 and at its end remote from the pin 67 has a threaded extension upon which is mounted a securing nut 70 adapted to bear against the lug 69 and hold the stud 68 and with it the pin 67 against turning movement. Upon backing off the nut 70 so as to relieve the pressure with which it engages the lug 69 the pin 67 may be turned to any position desired.

Figure 2:
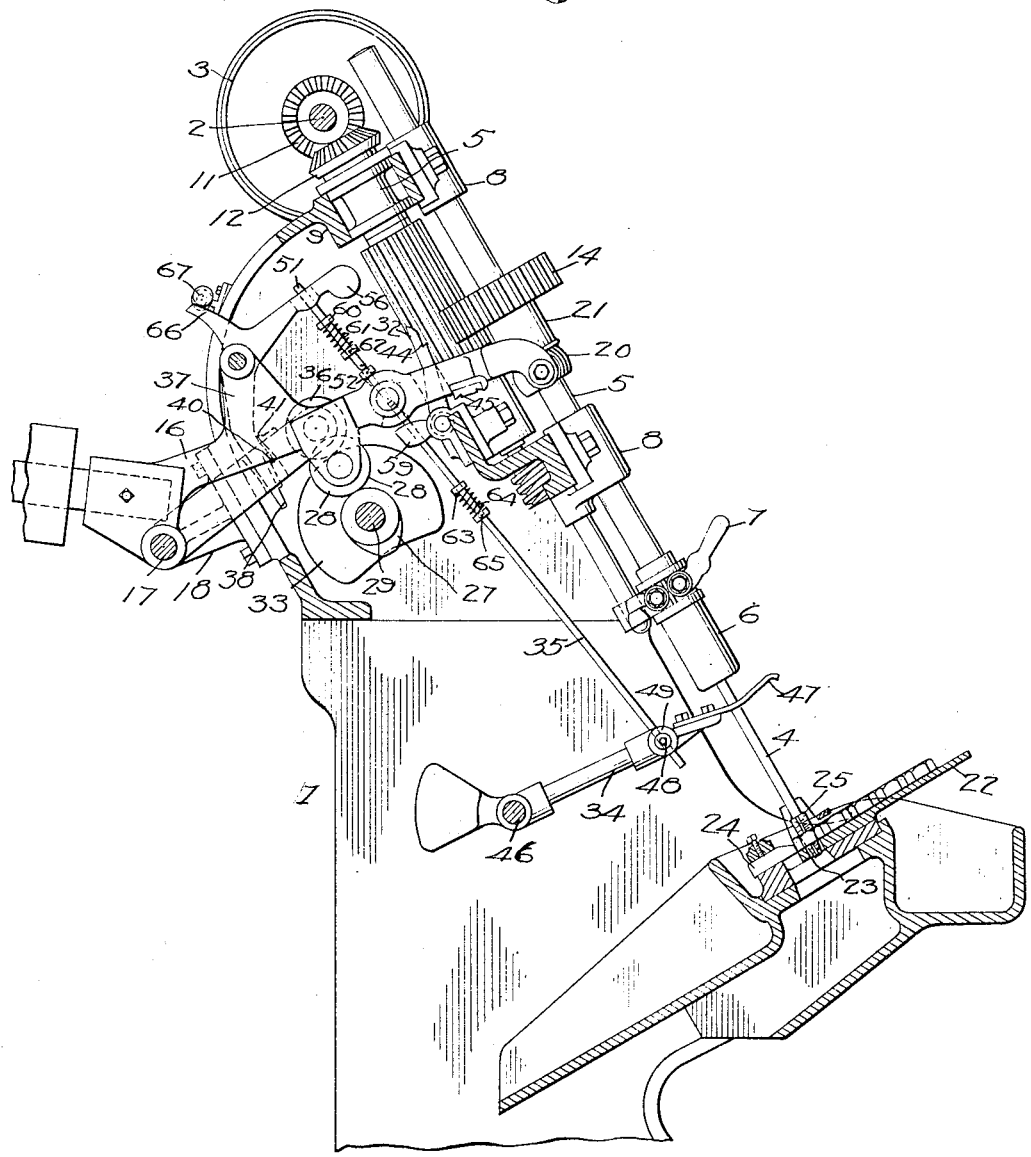
Figure 2 is a similar view at another period of the nut tapping operations.

In operation: The machine is conditioned for the tapping operation by moving the trip rod 35 downward relatively to the lever 16 to a position limited by the engagement of the collar 52 against said trip rod. The lowest point of the cam 33 coincides with the highest point of the cam 27. With the trip rod in its lower position as just described relatively to the lever 16, when the latter is in the position in which its roller 28 engages the highest point of the cam 27, the latch 31 will be in its normal inoperative position in which it disengages the lever 30. This relation of the parts is shown in Figure 1 and provides for the tapping operations. This is due to the fact that the lever 16 under the conditions described is disconnected from the lever 30 and hence will be subject to operation only by the cam 27 and will not be acted on by the cam 33. The tapping operation proceeds in the manner above explained and is sufficiently shown in Figures 1 and 2, Figure 1 showing the tap in its highest position as effected by the cam 27 and in which it is raised just sufficiently to permit the feed of a nut blank under the tap and Figure 2 showing the tap in its lowest position in which it extends through and has cut threads in the alining nut blank. When the nuts have accumulated in the predetermined number upon the shank of the tap, as above explained, the uppermost nut, incident to the upward movement of the tap, will engage the fork 47 and thereby operate the trip lever 34 to push the trip rod 35 upward relative to the lever 16. Such upward movement of the trip rod establishes its connection to the lever 16 by the latch pin 55 and also causes the engagement of the follower 60 against the lifting latch extension 56 and the compression of the spring 61 against the follower 60. The trip rod having been moved upward by the lever 34 as just described, when the lever 16 reaches the limit of its upward movement as effected by the cam 27 the latch 31 is moved by the follower 60 and spring 61 whereby its catch 40 overhangs the projection 41, this movement being to the right with reference to Figure 1 of the drawings. Thereby the lever 16 is operatively connected to the lifting lever 30 and is further operated by the cam 33, being raised to its highest position and carrying with it the chuck 6 to provide for the removal of the tap 4 as above explained. When the lever 16, as operated by the cam 33, approaches its highest position the spring 64 is compressed against the collar 63, the latter bearing against the fork 59 of the supporting latch. Very shortly before the lever 16 attains its highest position its projection 45 passes beyond the catch 44 of the supporting lever 32 which is thereupon operated by the spring 64 and collar 63 to engage said projection, the movement of the supporting lever being to the right with reference to Figure 1 of the drawing and being limited by its engagement against the adjacent wall of the slot 43. The supporting latch thereupon holds the lever 16 against downward movement to any substantial extent although the position in which the lever is held by the supporting latch is slightly below the highest position of said lever as effected by the cam 33. This difference in the elevated positions of the lever 16 is illustrated in Figures 3 and 4, Figure 3 showing the lever 16 supported in its highest position by the cam 33 and Figure 4 showing said lever supported in a slightly lower position by the latch 32. In the highest position of the lever 16 as shown in Figure 3 there is a slight clearance, indicated at 71, between the projection 45 and the catch 44; this clearance is sufficient to provide for the movement of the catch 44 from under the projection 45 when the support for the latch 32 provided by the follower 63 and spring 64 is withdrawn. The support thus provided for the latch 32 is maintained so long as the trip rod 35 is held by the latch pin 55 in its elevated position relative to the lever 16 but when said trip rod is moved downward to its normal position, as will be later explained, such support is withdrawn and thereupon the latch 32 returns by gravity to its normal inoperative position. The latch 32 can be returned to its normal position only by an ordered downward movement of the trip rod 35 and it follows that when said latch has once engaged the lever 16 the latter will be held in its elevated position as long as may be desired, that is to say until the operator depresses the trip rod. When the latch 32 is held in engaging position the lever 16 is supported during a period of each revolution of the cam shaft 29 directly by the cam 33 as shown in Figure 3, and during the remaining period of each revolution of said cam shaft, that is to say when the roller 36 rides in the valley of the cam, the lever 16 is supported by the latch 32 as shown in Figure 4. Thus the period of time during which the chuck 6 is effectively held in its elevated position is left wholly to the will of the operator and may, therefore, be as long or as short as may be required in order to effect the removal of a filled tap from said chuck and the substitution of a tap from which the nuts have been stripped. The chuck 6, as previously noted, may be of any construction suitable for the purpose in view; the drawings assume a chuck which is operated to release the tap by a downward movement of the handle 7 from the position thereof shown in Figure 3. When a tap from which the nuts have been stripped is inserted into the chuck and secured by moving the handle 7 to its upper position the machine is ready for the resumption of the tapping operation. For this purpose the operator, using the fork 47 as a hand grip, rocks the trip lever 34 downward, thereby lowering the trip rod 35 relatively to the lever 16 until the downward movement of said rod is limited by the engagement of its collar 52 against said lever. When the trip rod has thus been shifted downward by the operator the normal tapping operation of the machine is resumed automatically, due to the fact that the latches 31 and 32 are permitted to assume their normal inoperative positions, for this purpose moving by gravity to the right, Figure 3 of the drawing being considered, until their movement is arrested by the walls of the slots 39 and 43.

The object of the clearance 71 is, as above explained, to permit such movement of the latch 32 as will clear the catch 44 from the projection 45. Since the clearance 71 exists only in the extreme elevated position of the lever 16 it follows that before the latch 32 can be disengaged from said lever, the latter must be raised to a slight extent, that is to say from the position of Figure 4 in which it is supported by the latch to the position of Figure 3 in which it is supported by the cam 33. The trip rod having been shifted downward as shown in Figure 4 to provide for the resumption of the tapping operation, the support for the latch 32 provided by the collar 63 and spring 64 is withdrawn from which it follows that when the clearance 71 is created, as shown in Figure 3, the latch 32 will drop to its inoperative position. This is followed by the movement of the latch 31 to inoperative position, such movement being completed by the time the roller 36 touches the lowest point of the cam 33, and since this point coincides with the highest point of the cam 27 it follows that the support of the lever 16 is transferred from the cam 33 to the cam 27 and that thereafter the lever 16 moves downward and upward in response to the rotation of the cam 27, thus initiating the tapping operation and maintaining it continuously until the nuts have accumulated to the determined number upon the tap 4 at which time the trip lever 34 is automatically raised and the support of the lever 16 by the cam 33 and latch 32 is re-established.

By reference to Figure 4 it will be observed that when the trip rod 35 is shifted downward relative to the lever 16 the support for the lifting latch 31 provided by the collar 60 and spring 61 is withdrawn. If, as shown in Figure 4, the trip rod be moved to its lower position relative to the lever 16 during a period when the latter is supported by the latch 32 no disengagement of the latch 32 would take place if the latch 31 were left otherwise without means of maintaining or supporting it in its engaged position. The reason for this is that the clearance 71 is a necessary prerequisite of the disengagement of the latch 32 from the lever 16 and this clearance can be created only as the latch 31 is held in position to engage the lever 30. Consequently with the parts disposed as in Figure 4, if the latch 31 were permitted to drop when the trip rod 35 is shifted downward, said latch would not be effective for the slight raising of the lever 16 above the catch 44 necessary for the development of the clearance 71 and the lever 16 would remain supported by the latch 32, so that the tapping operation would not be resumed as intended. Consequently in the absence of means for continuing the latch 31 in its engaging position the trip rod 35 would have to be shifted during the period in which the clearance 71 is maintained; that is to say while the lever 16 is supported by the cam 33. To insure certainty in this respect, and therefore to avoid loss of time, the pin 67 is provided. This pin operating, as above explained, positively to hold the latch 31 in its engaging position, has the specific function of continuing the engaged position of the latch after the support therefor provided by the collar 60 and spring 61 has been withdrawn, all as shown in Figure 4. It follows that if the trip rod 35 be shifted downward relatively to the lever 16 in the period when said lever is supported by the latch 32, the latch 31 will not drop to inoperative position but will be held by the pin 67 ready to engage the projection 41 as the lever 30 is raised and hence will be effective to raise the lever 16 to the extent necessary to provide for the clearance 71.

If for any reason it should be necessary or desirable to interrupt the operation of any one of the taps for an indefinite period this can obviously be accomplished by raising the trip lever 34 by hand, using the fork 47 as a handle, until the trip rod 35 is connected by the pin 55 to the lever 16 whereupon the lever 16 is raised by the cam 33 and supported in its raised position by said cam and by the latch 32, all as above described.

Having fully described my invention, I claim:

1. In a power operated nut tapping machine, in combination, a rotatable and axially reciprocatory tap holder having a normal range of short axial reciprocations whereby the tap may engage a supported nut blank and may be lifted to a position just sufficiently high to permit a succeeding nut blank to be fed under the same and automatic means controlled by the number of tapped nuts upon the spindle for lifting the holder to a higher position to provide for the removal and re-insertion of the tap.

2. In a power operated nut tapping machine, in combination, a rotatable and axially reciprocatory tap holder, means for reciprocating said holder through a comparatively short range of movement, thereby to engage the tap with a supported nut blank and to lift the tap just sufficiently high to permit a succeeding nut blank to be fed under the same, automatic means for elevating the holder to a position above its normal range of movement in which the tap may be removed and inserted and for lowering the holder from such position and into operative relation to said first named means, means for supporting the holder in its elevated position and means for controlling the operations of said elevating and lowering means and said supporting means.

3. In a power operated nut tapping machine, in combination, a rotatable and axially reciprocatory spindle, a tap holder carried thereby, a spindle operating lever, automatic means for oscillating the same to produce the normal operations of the tap, automatic means for lifting the lever to a substantially higher position than that effected by said last named means, and means for rendering said lifting means operative or inoperative with respect to said lever.

4. In a power operated nut tapping machine, in combination, a rotatable and axially reciprocatory spindle, a tap holder carried thereby, a spindle operating lever, means for oscillating the same to produce the normal operation of the tap, automatic means for lifting the lever to a substantially higher position than that effected by said last named means, and means for supporting the lever in a position to which it is raised by said lifting means.

5. In a power operated nut tapping machine, in combination, a rotatable and axially reciprocatory spindle, a tap holder carried thereby, a spindle operating lever, means for oscillating the same to produce the normal operation of the tap, automatic means for lifting the lever to a substantially higher position than that effected by said last named means and for lowering the lever to provide for the resumption of the operation of said last named means, and means for controlling the operation of the lifting and lowering means.

6. In a power operated nut tapping machine, in combination, a rotatable and axially reciprocatory spindle, a tap holder carried thereby, a spindle operating lever, means for oscillating the same to produce the normal operation of the tap, automatic means for lifting the lever to a substantially higher position than that effected by said last named means and for lowering the lever to provide for the resumption of the operation of said last named means, means for supporting the lever in a position to which it is lifted by said lifting and lowering means, and means for controlling the operation of said lifting and lowering means and of said supporting means.

7. In a power operated nut tapping machine, in combination, a rotatable and axially reciprocatory spindle, a tap holder carried thereby, a spindle operating lever, a rotating cam normally engaging said lever to oscillate the same and thereby effect short axial reciprocations of said spindle to cause the tap to engage a supported nut blank and to lift the tap to a position just sufficiently high to permit a succeeding nut blank to be fed under the same, and automatic means for raising the operating lever to a position substantially higher than that effected by said cam to provide for the removal and replacement of said tap.

8. In a power operated nut tapping machine, in combination, a rotatable and axially reciprocatory spindle, a tap holder carried thereby, a spindle operating lever, a rotating cam normally engaging said lever to oscillate the same and thereby effect short axial reciprocations of said spindle to cause the tap to engage a supported nut blank and to lift the tap to a position just sufficiently high to permit a succeeding nut blank to be fed under the same, a second rotating cam adapted to raise the operating lever to a substantially higher position than that effected by the first cam whereby to provide for the removal and reinsertion of the tap, and means for operatively connecting the second cam and the operating lever whereby to transfer the operation of said lever from the first cam to the second cam.

9. In a power operated nut tapping machine, in combination, a rotatable and axially reciprocatory spindle, a tap holder carried thereby, a spindle operating lever, a rotating cam normally engaging said lever to oscillate the same and thereby effect short axial reciprocations of said spindle to cause the tap to engage a supported nut blank and to lift the tap to a position just sufficiently high to permit a succeeding nut blank to be fed under the same, a second rotating cam adapted to raise the operating lever to a substantially higher position than that effected by the first cam whereby to provide for the removal and re-insertion of the tap, means for operatively connecting the second cam and the operating lever whereby to transfer the operation of said lever from the first cam to the second cam, and means for supporting the lever in a position to which it is elevated by the second cam.

10. In a power operated nut tapping machine, in combination, a rotatable and axially reciprocatory spindle, a tap holder carried thereby, a spindle operating lever, a rotating cam normally engaging said lever to oscillate the same and thereby effect short axial reciprocations of said spindle to cause the tap to engage a supported nut blank and to lift the tap to a position just sufficiently high to permit a succeeding nut blank to be fed under the same, means for raising the operating lever to a position substantially higher than that effected by said cam to provide for the removal and replacement of said tap, and means for supporting the operating lever in a position to which it is elevated by said last named means.

11. In a power operated nut tapping machine, in combination, a rotatable and axially reciprocatory spindle, a tap holder carried thereby, means for reciprocating said spindle through a lower range, automatic means for moving said spindle through an upper range, and means for changing from the operation of said reciprocating means to the operation of said moving means or from the operation of said moving means to the operation of said reciprocating means.

12. In a power operated nut tapping machine, in combination, a rotatable and axially reciprocatory spindle, a tap holder carried thereby, means for reciprocating said spindle through a lower range, means for moving said spindle through an upper range, a shiftable trip element, and normally inoperative means operated by said element on a movement thereof in one direction for causing the operation of said spindle by said last named means.

13. In a power operated nut tapping machine, in combination, a rotatable and axially movable spindle, a tap holder carried thereby, an operating lever for said spindle, a rotating cam normally engaging said lever to oscillate the same, a lifting lever, a second rotating cam normally engaging said lifting lever, and means for connecting said lifting lever operatively to said operating lever.

14. In a power operated nut tapping machine, in combination, a rotatable and axially movable spindle, a tap holder carried thereby, an operating lever for said spindle, a rotating cam normally engaging said lever to oscillate the same, a lifting lever, a second rotating cam normally engaging said lifting lever, means for connecting said lifting lever operatively to said operating lever, a shiftable element for operating said connecting means, and means for supporting said operating lever in an elevated position to which it is raised by said lifting lever.

15. In a power operated nut tapping machine, in combination, a rotatable and axially movable spindle, a tap holder carried thereby, an operating lever for said spindle, a rotating cam normally engaging said lever to oscillate the same, a lifting lever, a second rotating cam normally engaging said lifting lever, means for connecting said lifting lever operatively to said operating lever, means for supporting said operating lever in an elevated position to which it is raised by said lifting lever, and a shiftable element for operating said connecting means and said supporting means.

16. In a power operated nut tapping machine, in combination, a rotatable and axially movable spindle, a tap holder carried thereby, an operating lever for said spindle, a rotating cam normally engaging said lever to oscillate the same, a lifting lever, a second rotating cam normally engaging said lifting lever, means for connecting said lifting lever operatively to said operating lever, means for supporting said operating lever in an elevated position to which it is raised by said lifting lever, and means co-operating with said connecting means in the supported position of said operating lever for maintaining said connecting means in operative relation.

17. In a power operated nut tapping machine, in combination, a rotatable and axially movable spindle, a tap holder carried thereby, an operating lever for said spindle, a rotating cam normally engaging said lever to oscillate the same, a lifting lever, a second rotating cam engaging said lifting lever, means for connecting said lifting lever operatively to said operating lever, means for supporting said operating lever in an elevated position to which it is raised by said lifting lever, a shiftable element for operating said connecting means and said supporting means, and means co-operating with said connecting means in the supported position of said operating lever for maintaining said connecting means in operative relation.

18. In a power operated nut tapping machine, in combination, a rotatable and axially movable spindle, a tap holder carried thereby, an operating lever for said spindle, a rotating cam normally engaging said lever to oscillate the same, a lifting lever, a second rotating cam engaging said lifting lever, and a normally inoperative lifting latch carried by said operating lever and movable to a position in which it functions as an operative connection between said operating lever and said lifting lever.

19. In a power operated nut tapping machine, in combination, a rotatable and axially movable spindle, a tap holder carried thereby, an operating lever for said spindle, a rotating cam normally engaging said lever to oscillate the same, a lifting lever, a second rotating cam engaging said lifting lever, a normally inoperative lifting latch carried by said operating lever and movable to a position in which it functions as an operative connection between said operating lever and said lifting lever, and a normally inoperative supporting latch movable in an elevated position of said operating lever effected by said lifting lever to engage said operating lever and support the same.

20. In a power operated nut tapping machine, in combination, a rotatable and axially movable spindle, a tap holder carried thereby, an operating lever for said spindle, a rotating cam engaging said lever to oscillate the same, a lifting lever, a second rotating cam engaging said lifting lever, a normally inoperative lifting latch carried by said operating lever and movable to a position in which it functions as an operative connection between said operating lever and said lifting lever, a shiftable element for operating said latch, a normally inoperative supporting latch for said lifting lever, and means operative when the operating lever is raised by the lifting lever for engaging said supporting latch with the operating lever, thereby to support the latter in an elevated position.

21. In a power operated nut tapping machine, in combination, a rotatable and axially movable spindle, a tap holder carried thereby, an operating lever for said spindle, a rotating cam normally engaging said lever to oscillate the same, a lifting lever, a second rotating cam engaging said lifting lever, a normally inoperative lifting latch carried by said operating lever and movable to a position in which it functions as an operative connection between said operating lever and said lifting lever, a normally inoperative supporting latch for said lifting lever, an element shiftable relatively to said lifting lever and having means operative consequent to the shifting of said element to engage said lifting latch with said lifting lever and other means operative consequent to the upward movement of said operating lever by said lifting lever to engage said supporting latch with said operating lever, and yieldable means for connecting said shiftable element to said operating lever.

22. In a power operated nut tapping machine, in combination, a rotatable and axially movable spindle, a tap holder carried thereby, an operating lever for said spindle, a rotating cam normally engaging said lever to oscillate the same, a lifting lever, a second rotating cam engaging said lifting lever, a normally inoperative lifting latch carried by said operating lever and movable to a position in which it functions as an operative connection between said operating lever and said lifting lever, a normally inoperative supporting latch for said lifting lever, an element shiftable relatively to said lifting lever and having means operative consequent to the shifting of said element to engage said lifting latch with said lifting lever and other means operative consequent to the upward movement of said operating lever by said lifting lever to engage said supporting latch with said operating lever, yieldable means for connecting said shiftable element to said operating lever, and means operative in the supported position of said operating lever for maintaining said lifting latch in operative position.

In testimony whereof I affix my signature.

EDSON L. WORBOIS.